United States Patent
Norwood et al.

(10) Patent No.: US 8,959,422 B2
(45) Date of Patent: Feb. 17, 2015

(54) REDUCING SYSTEM RESOURCE REQUIREMENTS FOR USER INTERACTIVE AND CUSTOMIZABLE IMAGE-BASED PRODUCT DESIGNS

(75) Inventors: Daniel J. Norwood, Tempe, AZ (US); Jonathan Scott Delamater, Mesa, AZ (US); Stephen Kuenzli, Chandler, AZ (US); Gurushyam Hariharan, Gilbert, AZ (US)

(73) Assignee: Shutterfly, Inc., Redwood City, CA (US)

( * ) Notice: Subject to any disclaimer, the term of this patent is extended or adjusted under 35 U.S.C. 154(b) by 340 days.

(21) Appl. No.: 13/457,915

(22) Filed: Apr. 27, 2012

(65) Prior Publication Data
US 2012/0284594 A1    Nov. 8, 2012

Related U.S. Application Data

(60) Provisional application No. 61/481,397, filed on May 2, 2011.

(51) Int. Cl.
*G06F 17/00* (2006.01)
*G06F 3/0481* (2013.01)

(52) U.S. Cl.
CPC ..................... *G06F 3/0481* (2013.01)
USPC ........................................................ 715/202

(58) Field of Classification Search
CPC .............. G06F 17/3028; G06F 17/048; G06F 17/04842; G06F 17/1242
USPC ......... 715/202, 203, 204, 243, 244, 245, 246, 715/247
See application file for complete search history.

(56) References Cited

U.S. PATENT DOCUMENTS

| | | | |
|---|---|---|---|
| 5,974,401 | A | 10/1999 | Enomoto |
| 6,017,157 | A | 1/2000 | Garfinkle et al. |
| 6,064,397 | A | 5/2000 | Herregods |
| 6,154,295 | A | 11/2000 | Fredlund |
| 6,288,719 | B1 | 9/2001 | Squilla |
| 6,349,194 | B1 | 2/2002 | Nozaki |

(Continued)

FOREIGN PATENT DOCUMENTS

| | | |
|---|---|---|
| EP | 0 975 147 A2 | 10/1999 |
| WO | WO 01/82231 | 11/2001 |

OTHER PUBLICATIONS

Chao, Hui, et al, "Structured Layout for Resizable Background Art", 2009, IMCE '09 Proceedings of the 1st International Workshop on Interactive Multimedia for Consumer Electronics, p. 67-72.*

*Primary Examiner* — Laurie Ries
(74) *Attorney, Agent, or Firm* — Xin Wen

(57) ABSTRACT

A method for assisting a user to design a photo book includes displaying layouts of a first page and a second page of the photo book at the user interface, storing a first snapshot image and a first dynamic render object in association with the first page and a second snapshot image and a second dynamic render object in association with the second page, allowing a user to select the first page for editing by at the user interface, in response to user selection of the first page, representing the first page by the first dynamic render object at the user interface, representing the second page by the second snapshot image at the user interface, and allowing the user to vary the first dynamic render object in the first page at the user interface.

20 Claims, 8 Drawing Sheets

(56) References Cited

U.S. PATENT DOCUMENTS

| | | |
|---|---|---|
| 6,362,900 B1 | 3/2002 | Squilla |
| 6,388,732 B1 | 5/2002 | Williams |
| 6,570,640 B1 | 5/2003 | Garfinkle et al. |
| 6,667,814 B1 | 12/2003 | Tillotson |
| 6,727,909 B1 | 4/2004 | Matsumura |
| 6,771,801 B1 * | 8/2004 | Fisher et al. .................. 382/112 |
| 8,463,847 B2 * | 6/2013 | Cok et al. ...................... 709/203 |
| 2002/0154147 A1 * | 10/2002 | Battles .......................... 345/660 |
| 2004/0032599 A1 | 2/2004 | Atkins |
| 2008/0222560 A1 * | 9/2008 | Harrison ....................... 715/800 |
| 2010/0180234 A1 * | 7/2010 | Szuszczewicz ............... 715/838 |
| 2011/0012929 A1 * | 1/2011 | Grosz et al. ................... 345/661 |
| 2011/0099501 A1 * | 4/2011 | Mull et al. ..................... 715/771 |
| 2011/0167353 A1 * | 7/2011 | Grosz et al. ................... 715/738 |

* cited by examiner

REDUCING SYSTEM RESOURCE REQUIREMENTS FOR USER INTERACTIVE AND CUSTOMIZABLE IMAGE-BASED PRODUCT DESIGNS

CROSS-REFERENCES TO RELATED APPLICATIONS

The present application claims priority to pending U.S. provisional patent application 61/481,397, titled "Reducing system resource requirements for user interactive and customizable image-based product designs", filed by the same inventors on May 2, 2011, the content of which is incorporated herein by reference.

BACKGROUND OF THE INVENTION

Personalized photo products such as photobooks, greeting cards, and photo calendars often include many customizable features. Creating such an image-based product requires storing and presenting many variable objects by a computer device, and many, frequent user interactions at the computer user interface. A user interface that allows a user to edit multiple photobook pages can easily include thousands to tens of thousands variable components. The product design operations tend to require a lot of computation resources, which are often beyond the capabilities of many users' computers.

Performance is therefore a serious issue in highly interactive image-based product designs. Some users can experience very slow responses in displaying and refreshing after each user commanded component change. Sometimes, the user computer may be frozen under the heavy computation load of the design tasks. There is therefore a need to allow users to design image-based product in a more time responsive manner.

SUMMARY OF THE INVENTION

Embodiments may include one or more of the following advantages. The disclosed systems and methods provide faster user-interface responses and thus enhanced user experience in image-based product designs without compromising user viewing experience. The disclosed systems and methods significantly reduce requirements on processing power and memory on users' computers, thus enabling users to design highly interactive customizable image-based products on w wider range of devices. The disclosed systems and methods also reduce the amount of data in client-server communications and thus improving network efficiency.

In one aspect, the present application relates to a method for assisting a user to design an image-based product. The method includes: enabling the display of a design of an image-based product comprising a plurality of pages at a user interface by a computer system; storing, on the computer system, a snapshot image and one or more dynamic render objects in association with each of the plurality of pages in the design of the image-based product, wherein the one or more dynamic render objects are configured to be varied by a user; allowing a first page to be selected for editing by a user at the user interface; in response to the user selection of the first page, representing the first page at the user interface by the one or more dynamic render objects associated with the first page; representing the plurality of pages other than the first page by their respective snapshot images at the user interface; allowing the user to vary the one or more dynamic render objects in the first page at the user interface; allowing a second page to be selected by the user at the user interface; in response to the user selection of the second page, storing an updated snapshot image for the first page on the computer system; representing the first page by the updated snapshot image at the user interface; in response to the user selection of the second page, changing representation of the second page at the user interface to the one or more dynamic render objects associated with the second page; representing the plurality of pages other than the first page and the second page by their respective snapshot images at the user interface; and allowing the user to vary the one or more dynamic render objects in the second page at the user interface to create at least a portion of the design for the image-based product.

Implementations of the methods may include one or more of the following. The computer system can include a network-based system, a standalone computer device, or a mobile device. The first page or the second page can be respectively selected by moving a cursor over the first page or the second page at the user interface, wherein the cursor is moved with a mouse by the user. The user interface can be displayed on a touch sensitive display device, wherein the first page or the second page is selected by touching the touch sensitive display device by the user. The user is allowed to vary an image, text, a dimension, a color of the one or more dynamic render objects in the first page or the second page. The image-based product can include a photo book, a photo calendar, a photo collage, a photo album, a photo greeting card, a photo stationery, a image print, a photo banner, a photo T-shirt, a photo coffee mug, a photo mouse pad, a photo key-chain, a photo collector, or a photo coaster. The image-based product can include a personalized digital photo story, a photo blog, an electronic photo messages, and a photo posting, the method further comprising electronically sharing the design of image-based product. The image-based product can include a photo book; the method can further include displaying a multi-page view comprising layouts of the plurality of pages at the user interface, wherein each of the layouts is represented by either the snapshot image or the one or more dynamic render objects associated with the corresponding one of the plurality of pages.

In another aspect, the present application relates to a method for assisting a user to design an image-based product. The method includes: enabling the display of a design of an image-based product comprising a plurality of components at a user interface by a computer system; storing, on the computer system, a snapshot image and one or more dynamic render objects in association with each of the plurality of components in the design of the image-based product, wherein the one or more dynamic render objects are configured to be varied by a user; allowing a first component to be selected for editing by a user at the user interface; in response to the user selection of the first component, representing the first component at the user interface by the one or more dynamic render objects associated with the first component; representing the plurality of components other than the first component by their respective snapshot images at the user interface; allowing the user to vary the one or more dynamic render objects in the first component at the user interface; allowing a second component to be selected by the user at the user interface; in response to the user selection of the second component, storing an updated snapshot image for the first component on the computer system; representing the first component by the updated snapshot image at the user interface; in response to the user selection of the second component, representing the second component at the user interface by the one or more dynamic render objects associated with the second component; representing the plurality of components other than the first component and the second component by their respective snapshot images at the user interface; and allowing the user to vary the one or more dynamic render objects in the second component at the user interface to create at least a portion of the design for the image-based product.

Implementations of the methods may include one or more of the following. The computer system comprises a network-based system, a standalone computer device, or a mobile device. The first component or the second component can be respectively selected by moving a cursor over the first component or the second component at the user interface, wherein the cursor is moved with a mouse by the user. The user interface can be displayed on a touch sensitive display device, wherein the first component or the second component is selected by touching the touch sensitive display device by the user. The image-based product can include a plurality of pages, wherein the plurality of components can include the plurality of pages. The user is allowed to vary an image, text, a dimension, a color of the one or more dynamic render objects in the first component or the second component. The image-based product can include a photo book, a photo calendar, a photo collage, a photo album, a photo greeting card, a photo stationery, a image print, a photo banner, a photo T-shirt, a photo coffee mug, a photo mouse pad, a photo key-chain, a photo collector, or a photo coaster. The image-based product can include a personalized digital photo story, a photo blog, an electronic photo messages, and a photo posting, the method can further include electronically sharing the design of image-based product.

In another aspect, the present application relates to a A method for assisting a user to design a photo book. The method includes: displaying a design of the photo book comprising a plurality of pages at a user interface by a computer system; displaying layouts of a first page and a second page of the photo book at the user interface; storing, on a computer system, a first snapshot image and a first dynamic render object in association with the first page and a second snapshot image and a second dynamic render object in association with the second page; allowing a user to select the first page for editing by at the user interface; in response to user selection of the first page, representing the first page by the first dynamic render object at the user interface; representing the second page by the second snapshot image at the user interface; allowing the user to vary the first dynamic render object in the first page at the user interface; allowing the user to select the second page for editing at the user interface; in response to user selection of the second page, storing an updated snapshot image for the first page on the computer system, wherein the updated snapshot image comprises changes made by the user to the first dynamic render object; representing the first page by the updated snapshot image at the user interface; in response to the user selection of the second page, changing representation of the second page at the user interface to the second dynamic render object; and allowing the user to vary the second dynamic render object in the second page at the user interface to create at least a portion of the design for the photobook.

Implementations of the methods may include one or more of the following. The computer system can include a network-based system, a standalone computer device, or a mobile device. The first page or the second page can be respectively selected by moving a cursor over the first page or the second page at the user interface, wherein the cursor is moved with a mouse by the user. The user interface can be displayed on a touch sensitive display device, wherein the first page or the second page is selected by touching the touch sensitive display device by the user.

BRIEF DESCRIPTION OF THE DRAWINGS

The accompanying drawing, which are incorporated in and form a part of this specification, illustrate embodiments of the invention and, together with the description, serve to explain the principles of the invention.

Although the invention has been particularly shown and described with reference to multiple embodiments, it will be understood by persons skilled in the relevant art that various changes in form and details can be made therein without departing from the spirit and scope of the invention.

DETAILED DESCRIPTION OF THE INVENTION

Figure 1:
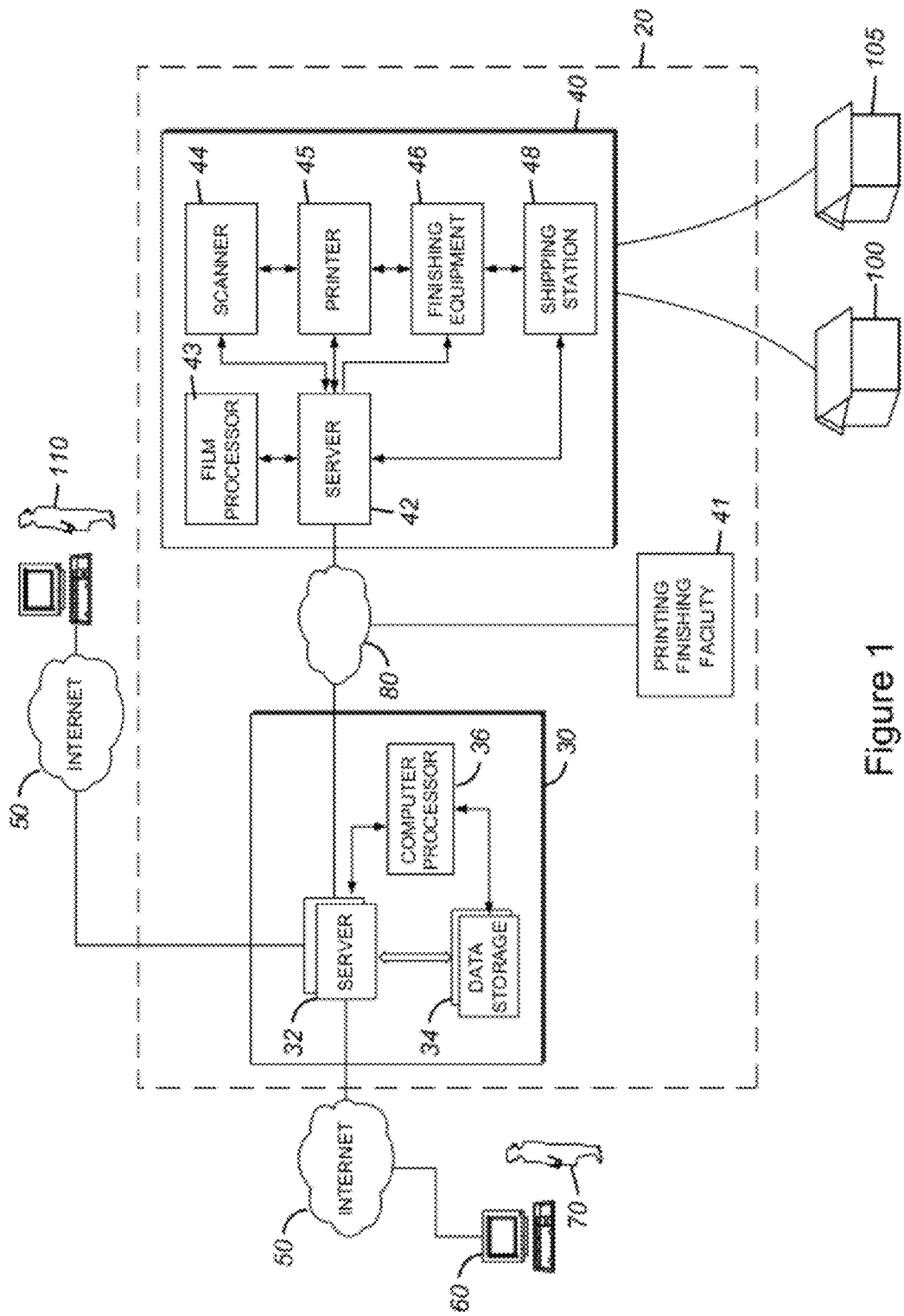
FIG. 1 is a block diagram of a network-based image service system for producing personalized image-based products.

Referring to FIG. 1, a network-based image service system 20 can be established by an image service provider to provide image services and products on a wide area network such as the Internet 50. The network-based image service system 20 can include a data center 30, one or more product fulfillment systems 40 and 41, and a computer network 80 that can facilitate the communications between the data center 30 and the product fulfillment systems 40 and 41.

In the present specification, the term "personalized" is used in personalized content, personalized messages, personalized images, and personalized designs that can be incorporated in the personalized products. The term "personalized" refers to the information that is specific to the recipient, the user, the gift product, or the intended occasion. The content of personalization can be provided by a user or selected by the user from a library of content provided by the image-server provided. The content provided can include stock images and content licensed from a third party. The term "personalized information" can also be referred to as "individualized information" or "customized information". Examples of personalized image-based products may include personalized photo greeting cards, photo prints, photo books, photo T-shirt, and photo, mugs etc. The personalized image-based products can include users' photos, personalized text, and personalized designs.

In the present application, image-based products can include photo books, personalized greeting cards, photo stationery, photo or image prints, photo posters, photo banners, photo playing cards, photo T-shirts, photo coffee mugs, photo mouse pads, photo key-chains, photo collectors, photo coasters, or other types of photo gift or novelty item. The term "photo book" refers to books that include one or more pages and at least one image on a book page. Photo books can include photo albums, scrapbooks, bound photo calendars, or photo snap books, etc. The photo book in the disclosed system can include personalized image and text content provided by a user or by a third party.

The data center 30 can include one or more servers 32, data storage devices 34 for storing image data, user account and order information, and one or more computer processors 36 for processing orders and rendering digital images. An online-photo website can be powered by the servers 32 to serve as a web interface between the users 70 and the image service provider. The users 70 can order image-based products from the web interface. The product fulfillment systems 40 and 41 can produce the ordered image-based products such as photographic prints, greeting cards, holiday cards, post cards, photo albums, photo calendars, photo books, photo T-shirt, photo mugs, photo aprons, image recording on compact disks (CDs) or DVDs, and framed photo prints. The architecture of the data storage devices 34 is designed to optimize the data accessibility, the storage reliability and the cost.

The image-based product fulfillment system 40, 41 can be co-located at the data center 30. Alternatively, the image-based product fulfillment system 40, 41 can be located remotely from the data center 30. The image-based product fulfillment system 40, 41 can be set up. Each image-based product fulfillment system 40 or 41 can be geographically located close to a large population of customers to shorten order delivery time. Furthermore, the product fulfillment systems 40 and 41 and the data center 30 can be operated by different business entities. For example, a first business entity can own the data center 30 and host the website that can be accessed by the users 70. The product fulfillment systems 40 and 41 can be owned and operated by a second business entity (i.e. an application service provider).

The image-based product fulfillment system 40 can include one or more servers 42, printers 45 for printing images on physical surfaces, finishing equipment 46 for operations after the images are printed, and shipping stations 48 for confirming the completion of the orders and shipping the ordered image-based products to the user 70 or recipients 100 and 105. The servers 42 can communicate with the data center 30 via the computer network 80 and facilitate the communications between different devices and stations in the image-based product fulfillment system 40. The computer network 80 can include a Local Area Network, a Wide Area Network, and wireless communication network.

The printers 45 can receive digital image data and control data, and reproduce images on receivers. The receivers can be separate photo prints, or pages to be incorporated into photo books. Examples of the printers 45 include can be digital photographic printers, offset digital printers, or digital printing presses. The printers 45 can also include inkjet. The product fulfillment systems 40 and 41 can include a film processor 43 for processing exposed films, and a scanner 44 for digitizing processed film stripes. The order information and image data can be transferred from servers 32 to the servers 42 using a standard or a proprietary protocol (FTP, HTTP, among others).

The finishing equipment 46 can perform operations for finishing a complete image-based product other than printing, for example, cutting, folding, adding a cover to photo book, punching, stapling, gluing, binding, envelope printing and sealing, packaging, labeling, package weighing, and postage metering. The finishing operations can also include framing a photo print, recording image data on a CD-ROM and DVD, making photo T-shirts and photo mugs, etc. Furthermore, the printers 45 and the finishing equipments 46 can reside at different locations.

Figure 2:
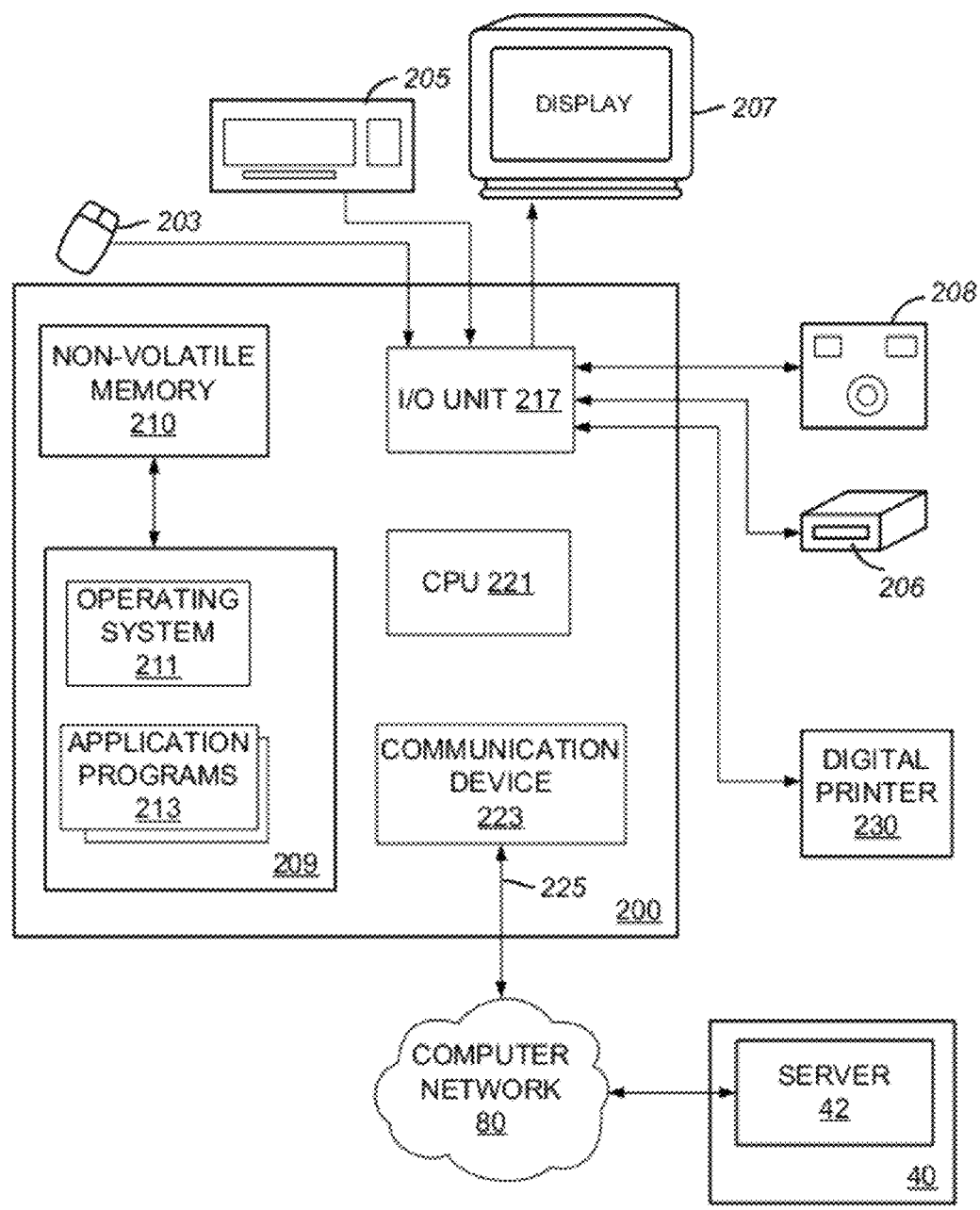
FIG. 2 illustrates an exemplified computer for producing personalized image-based products and also suitable for the network-based image service system of FIG. 1.

A user 70 can access the online-photo website using a computer device 60 as shown in FIG. 2. The computer device 60 can be a personal computer, a portable computer device, a mobile phone, a tablet computer, or a public computer terminal such as a kiosk. The computer device 60 allows a user 70 to execute software to perform tasks such as communicating with other computer users, accessing various computer resources, and viewing, creating, or otherwise manipulating electronic content, that is, any combination of text, images, movies, music or other sounds, animations, 3D virtual worlds, and links to other objects. Exemplary components of the computer device 60, shown in FIG. 2, include input/output (I/O) devices (mouse 203, keyboard 205, display 207) and a computer 200 having a central processor unit 221, an I/O unit 217 and a memory 209 that stores data and an operating system 211, and one or more application programs 213 including applications for viewing, managing, and editing digital images. The computer 200 also includes non-volatile memory 210 and a communications device 223 for exchanging data with an Internet 50 via a communications link 225 (e.g. an optical fiber, cable, telephone line, and wireless communication etc.). The user can use a web browser to communicate with image-based product fulfillment system 40.

The computer 200 can communicate with various peripheral I/O devices such as an image capture device (digital camera, film scanner or reflective scanners) in wired or wireless communication methods to allow the images to be transferred to a non-volatile memory 210 using a card reader 206.

The computer 200 allows the user 70 to communicate with the online-photo website using the communication device 223. The user 70 can set up and access her personal account. The user 70 can enter user account information such as the user's name, address, payment information, and information about the recipient of the image-based products. The user 70 can upload digital images to the online-photo website. The user can store images in an online photo album, create personalized image-based product at the web user interface, and order a personal image-based product and a gift product for specified recipients 100 and 105. The user 70 can design and order physical image-based products via the Internet using service provided by an online image service provider such as Shutterfly, Inc., located at Redwood City, Calif. The production of these image-based products often requires the use of commercial equipment available at the image-based product fulfillment system 40 and 41.

After the image service provider has received the user's images, the image service provider can host the images on the online photo website, at which the user can view and access the images using a web browser or a locally installed software application. The user 70 can access the online-photo website to create and design a photo-based product such as a photo book and a photo greeting card, and specify the images to be reproduced on an image-based product and parameters relating to printing (e.g., finish, size, the number of copies). The user 70 can also designate one or more recipients 100 and 105 to whom the image-based products are to be sent. The user can place an order of the image-based product with the image service provider. The information entered by the user 70 can be stored on the server 32 and the data storage 34, and subsequently transmitted to an image-based product fulfillment system 40 or 41. The image-based products are printed by the printer 45 and finished by finishing equipment 46 according to the printing parameters as specified by the user 70. The image-based products are then delivered to the specified recipients 100.

Figure 3:
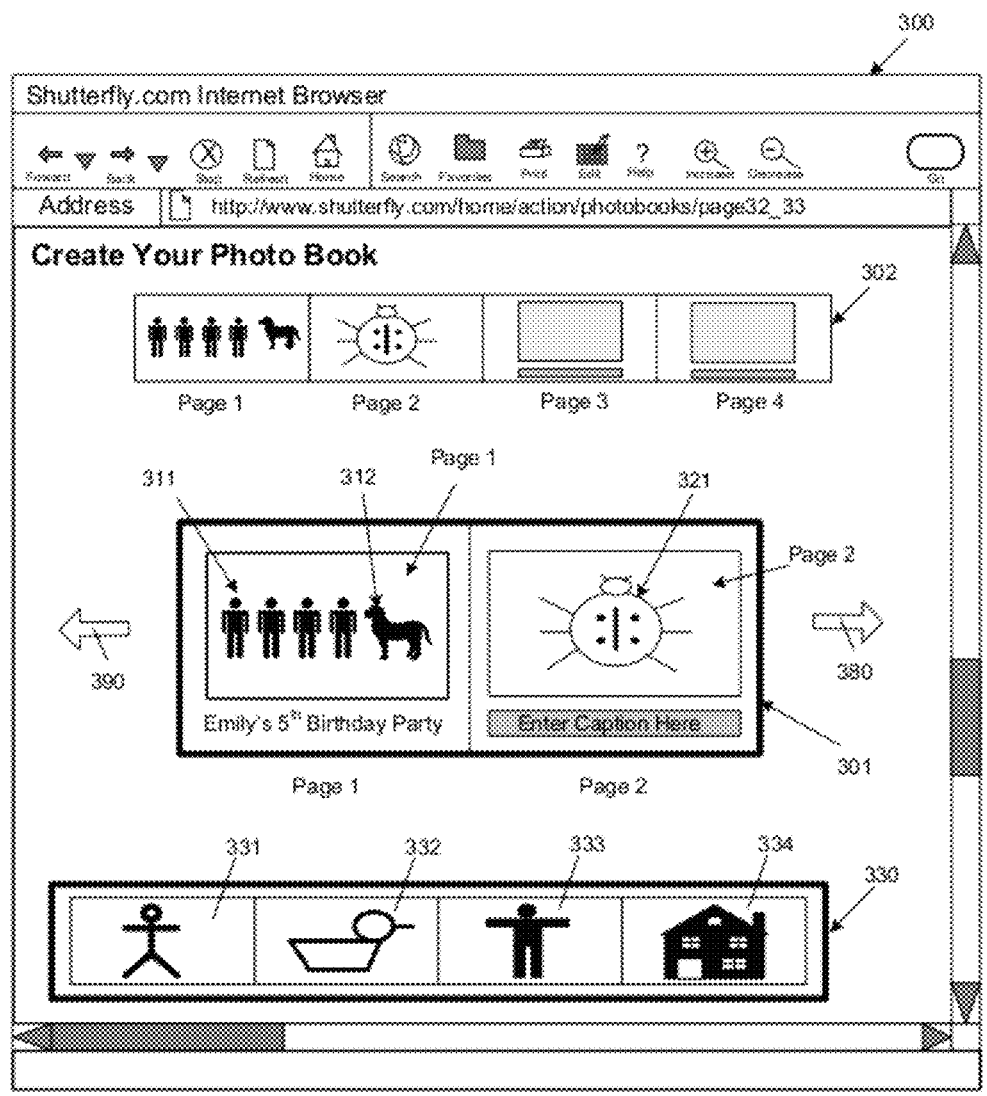
FIG. 3 illustrate a user interface for creating an image-based product comprising multiple pages and multiple components.

The network-based image service system 20 can enable a user interface 300, shown in FIG. 3, for users 70, 110 to create personalized image-based product. The user interface 300 can be in the form of a web browser, an application for a mobile device, or in other forms for users to visualize, edit, and add or delete components in product designs. The user interface 300 can be provided by the network-based image service system 20 (FIG. 1) or the computer 200 (FIG. 2) described above. For illustration purpose, the tools for creating a photobook are shown, which includes a multi-page view 301, a page-strip view 302, and an image collection 330. The multi-page view 301 includes page layouts for Page 1 and Page 2. For simplicity of illustration, only two pages are shown. In the practice, many pages can be shown in one view, for example, four, six, eight, sixteen pages that can be viewed and edited by a user in one view at a user interface. The multi-page views can include thousands of variable and editable components for the design of the image-based product. Page 1 can include a plurality of components such as component 311 and component 312. The user can click on navigation buttons 380, 390 to view different pages of the photobook design.

The page-strip view 302 includes a plurality of smaller sized images for showing the status of and navigation between pages. The page-strip view 302 shows current designs for different pages of the photobook. The user can click on one of the pages to see details of that page or start working on a new page (e.g. Page 3).

The image collection 330 includes one or more images 331-334 that can be incorporated into the photobook design. The images 331-334 may be provided by the user, or the image service provider.

In accordance to the present invention, when a personalized image-based product is being designed, components in the image product design are stored in two data presentations by the network-based image service system 20 or the computer 200. The components can exist at different levels: a whole page such as Page 1 and Page 2, and an image, a text string, or a design element within a page such as image components 311, 312 on Page 1.

For example, for designing a photobook, referring to FIG. 3, multiple photobook pages (see drawings) can be presented to the users. Each page can include a plurality of components such as image, text, clipart object, embellishments, and a background, layout metadata etc. The components can have any variable properties such as image content, text content, dimensions, colors, borders, image cropping properties, image edit properties, object layer sequence, overlapping and transparency properties, etc and can be represented in a variety of storage formats such as jpeg, gif, png file formats (for images), swf files (for flash objects) and xml files (for layout definitions).

The two data presentations for a design component include
a) a dynamic render object that allows users to interact and vary associated parameters (image, text, dimensions, colors etc.); and
b) a snapshot image that has fixed properties captured at a state of the dynamic render object.

Figure 4A:
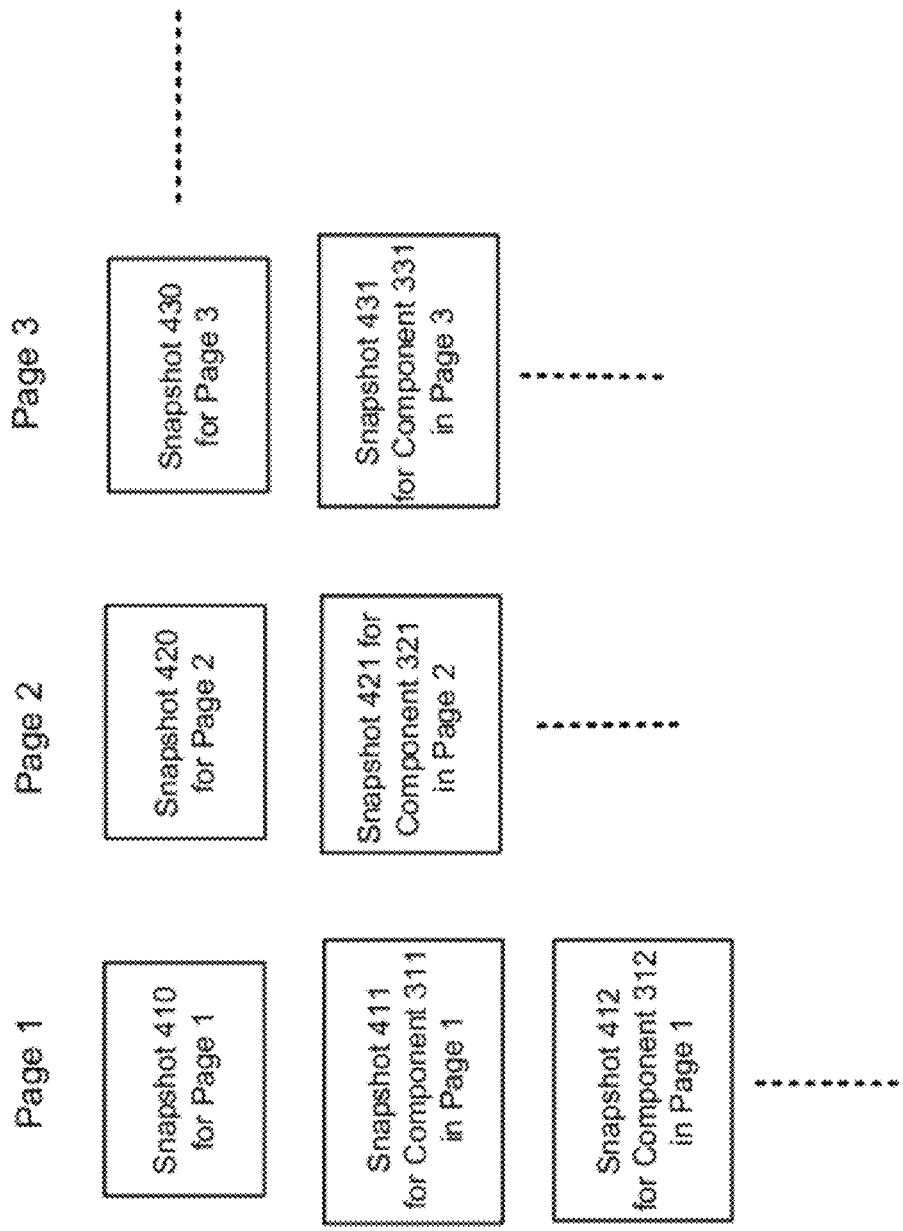
FIG. 4A illustrates static image representations for components in a design of an image-based product at a user interface in accordance with the present invention.

Referring to FIG. 4A, static image objects or the snapshots of the design components in the photobook (shown in FIG. 3) can be organized according to pages: Page 1, Page 2, Page 3 . . . . An example of a snapshot image is taken at the screen resolution, which saves the need for storing the many variable components on the page and their associated parameters. Each page as a whole can respectively be represented by static images, that is, snapshots of the pages. Pages 1-3 can be respectively represented by Snapshots 410, 420, 430.

In some embodiments, one or more components within each page can also be represented by snapshots. For example, Page 1 includes components 311 and 312 (FIG. 3); the two components can be represented by snapshots 411 and 412. Similarly, component 321 on Page 2 is represented by snapshots 421. Component 331 on Page 3 (not shown in FIG. 3) is represented by snapshots 431.

When the user is designing the component, the dynamic render object associated with the component is used and presented at the computer user interface, which allows the user to add, vary, edit, or delete features associated with that component. When the user is not providing input to the component, the snapshot is used to present that component, which reduces memory and processor resource while still providing high-quality viewing of the component to the user.

Figure 4B:
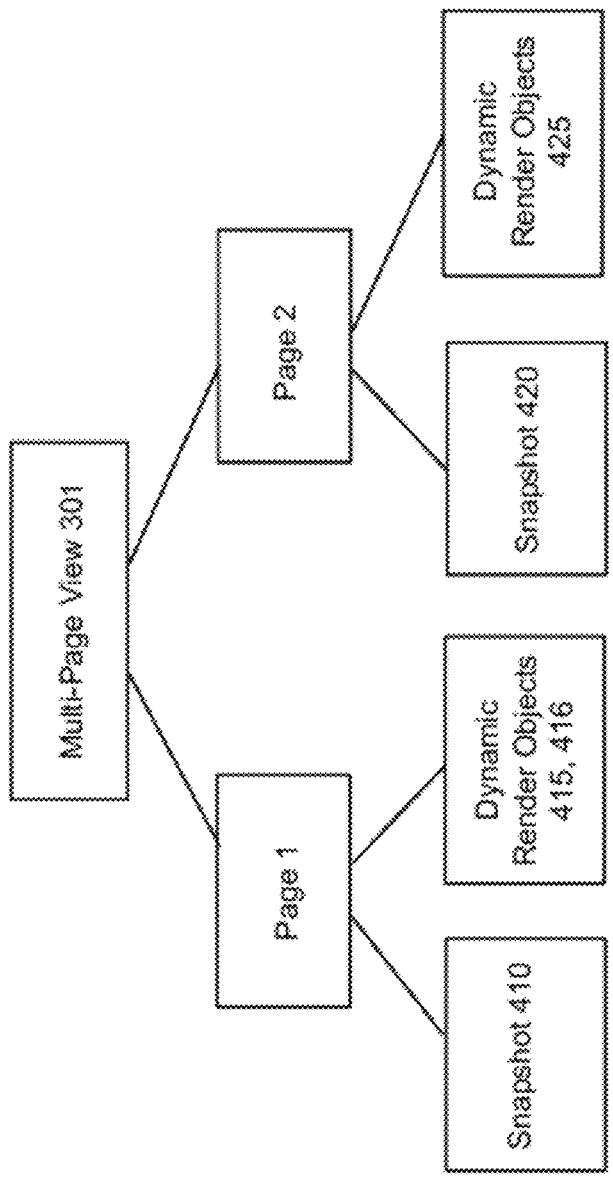
FIGS. 4B-4D illustrate data structures for presenting view objects in an image product design at a user interface in accordance with the present invention.

Referring to FIGS. 3 and 4B, the multi-page view 301 include a plurality of pages such as 2, 3, 4, 6, 8, 16 pages of a photobook that is being designed. Each viewable object (a whole page or components within pages) in the multi-page view 301 can be represented by a pair of static and dynamic representations. For example, Page 1 is represented by the snapshot 410, and dynamic render objects 415, 416 (not shown) for the components 311, 312 (FIG. 3). Page 2 is represented by the snapshot 420, and dynamic render object(s) 425 for the component 321 (FIG. 3).

In a session for image-based product creation, the two data representations for a component can be hot swapped from one to the other depending on whether the user is actively designing the component.

Referring to FIGS. 3 and 4B, when a user uses a mouse to move a cursor over Page 1 with a mouse (e.g. 203 in FIG. 2), the dynamic render objects 415, 416 for components 311, 312 on Page 1 are retrieved and instantaneously displayed to allow the user to edit parameters of the components in Page 1. The user can add, change, or delete images, text, and background on Page 1. The user can also add embellishment, change colors of images and text, and change sizes of images and text on the first page. Other pages such as Page 2 are not active, and thus are represented by their respective snapshots (e.g. snapshot 420 for Page 2) to save system resources.

When the user is done with editing Page 1 and uses a mouse to move a cursor to Page 2, the state of the components on Page 1 is captured. A snapshot 410 of Page 1 is stored as the snapshot 410 at this state. As the user uses a mouse to move a cursor from Page 1 to Page 2, the snapshot 420 (FIG. 4A) at the last state of Page 2 is replaced by the dynamic render object 425, which allows user commanded changes to Page 2. For reasons described above, referring to FIG. 4A, the snapshots are stored specific to the states at different times, which can evolve over time as the user adds, deletes, and edits each page.

Figure 4C:
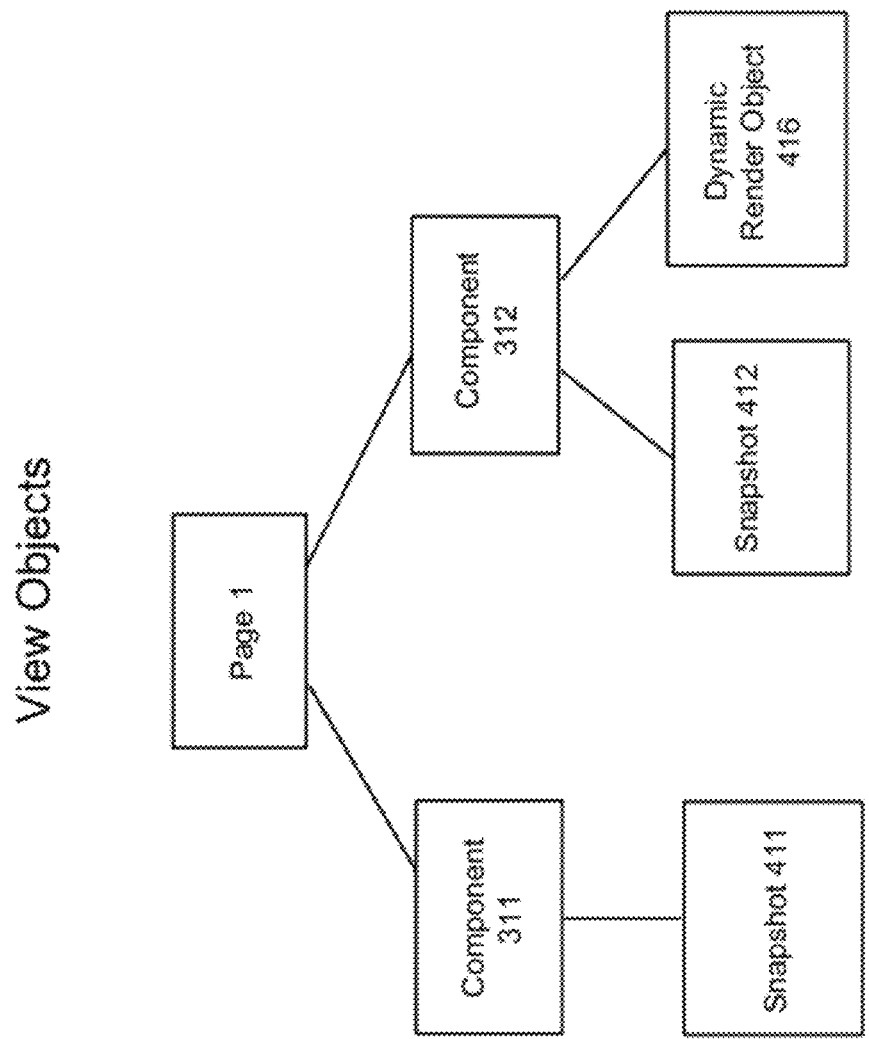

In some embodiments, a component within a page can be represented by a dynamic render object and a snapshot. Referring to FIG. 4C, Page 1 includes components 311, 312, each of which can be represented by a pair of dynamic and static data representations. For example, the component 312 is represented by the snapshot 412 and a dynamic render object 416. As a user mouses over (or uses fingers to touch over in a touch sensitive screen) one component on that page, only that component is represented by dynamic render object(s). The other components on the page can remain statically represented to save system resources.

Figure 4D:
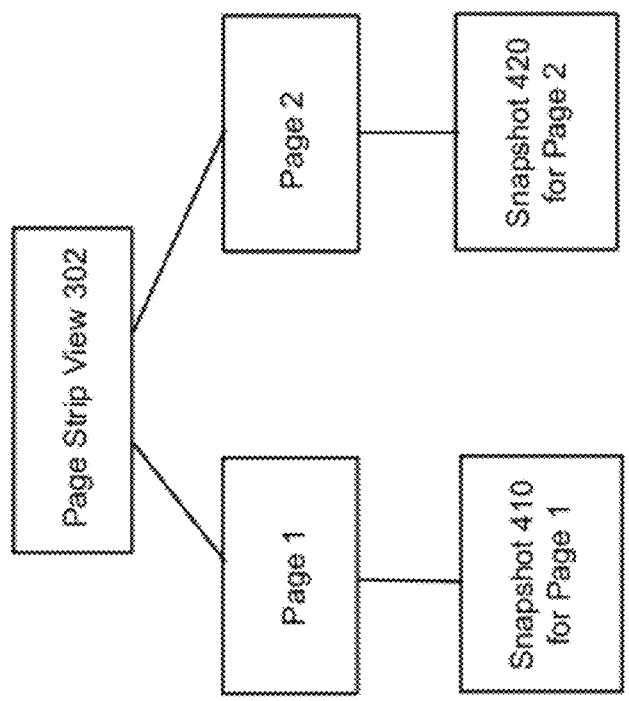

Referring to FIGS. 3 and 4D, the page-strip view 302 and the image collection 330 serve as overview and navigation purpose and are not for editing designs. The page-strip view 302 and the image collection 330 are typically represented by static data objects (snapshots) to save system resources.

An advantageous feature of the present application is that system requirements can be kept nearly constant by recycling the static and dynamic objects. That is, the rendering components used on the screen are recycled throughout user interactions. For example, as the user uses a mouse to move a cursor away from Page 1 to Page 2, the computer system swaps the renderers for Page 1 to render Page 2. Since a user usually edits one page (and one component within a page) at a time, the number of render components is not drastically increased.

System requirements can be further reduced by reusing the static images across the platform by up or down scaling the sizes of the snapshot images. In other words, the static snapshots are prepared and stored at different resolutions; they are not produced every time they are sued. As an example, a page can be represented by View 1, View 2 . . . at different resolutions. View 1 can be a higher resolution image for a large static image in the multi-page view 301 (FIG. 3). View 2 can be a lower resolution thumbnail image in the page-strip view 302.

Figure 5:
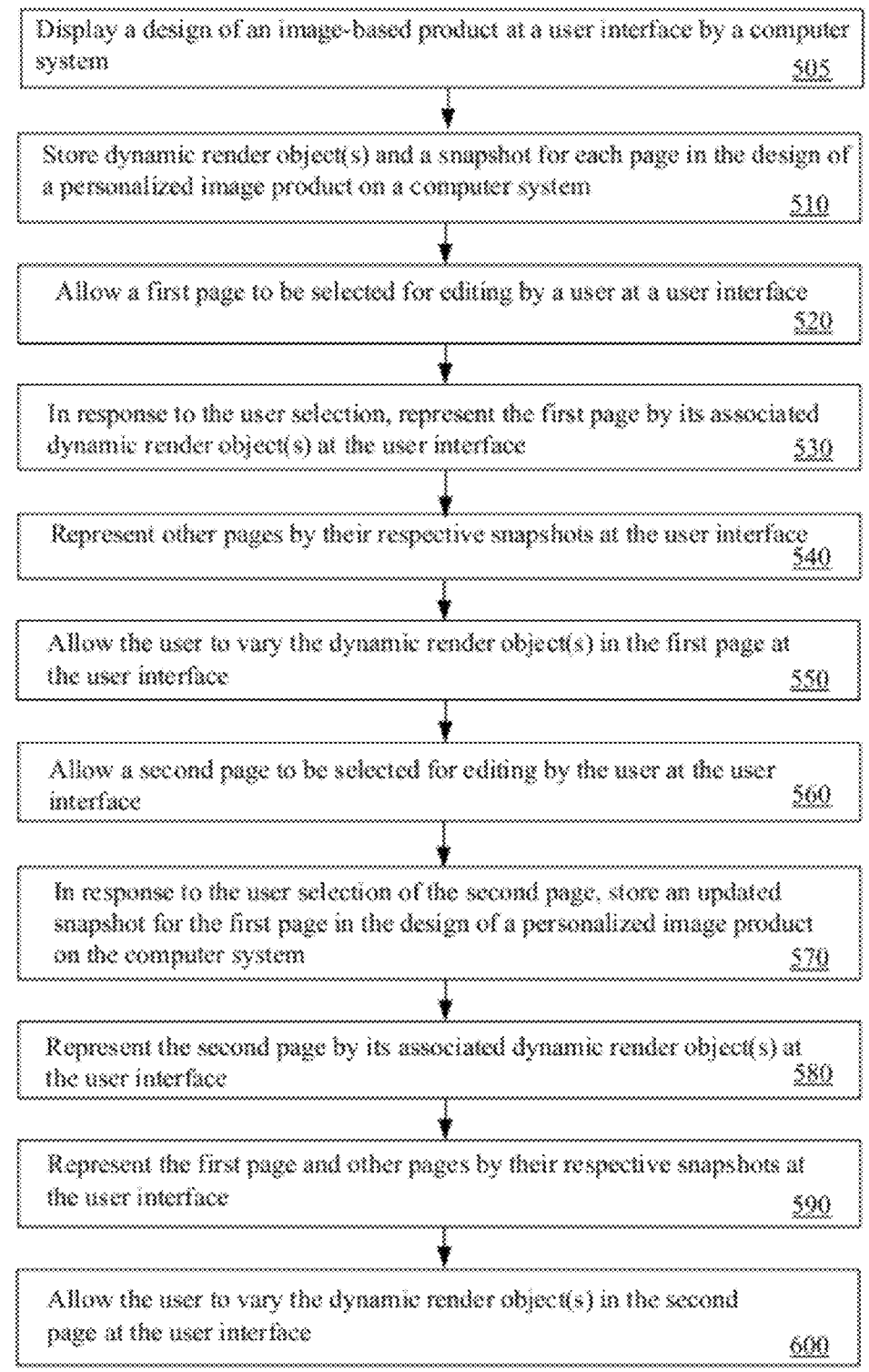
FIG. 5 shows an exemplified process for assisting a user to design an image-based product at a user interface.

An exemplified process for assisting a user to design an image-based product, as shown in FIG. 5, can include one or more of the following steps: a design of an image-based product is displayed at a user interface by a computer system (step 505). Dynamic render object(s) and a snapshot for each page is stored in association with the design of an image-based product on a computer system (step 510). The computer system can include a network-based system or a standalone computer device. The computer system receives selection of a first page from a user for editing the first page at a user interface (step 520). The selection can be in the form of moving a cursor by a mouse over the first page (i.e. mouse over) or by touching a touch-sensitive screen by a user's hand.

In response to the user selection, the first page is represented by its associated dynamic render object(s) at the user interface (step 530). Other pages of the image-based product are represented by their respective snapshots at the user interface (step 540), which saves system resources for storing, transmitting, and processing dynamic render data objects. The user is allowed to vary or edit the dynamic render object(s) in the first page at the user interface (step 550).

After the user is done with editing of the first page, a second page is selected by the user for editing by the user at the user interface (step 560). In response to the user selection of the second page, an updated snapshot for the first page is stored in the image-based product design on the computer system (step 570). The updated snapshot reflects the new editions, additions, and deletions performed by the user on the first page. The second page is represented by its associated dynamic render object(s) at the user interface (step 580). The first page and other pages (other than first and the second pages) are presented by their respective snapshots at the user interface to save system resources (step 590). The user is allowed to vary or edit the dynamic render object(s) in the second page at the user interface (step 600).

It should be noted that the disclosed methods and systems can be implemented without the specific arrangements or configurations. For example, the personalized image-based products can include image-based products other than photobooks, such as, photo calendars, photo greeting cards and stationeries, a photo collage, a photo album, a photo T-shirt, a page of a photo calendar, photo gifts such as a photo coffee mug, a photo mouse pad, a photo key-chain, a photo collector, or a photo coaster.

The personalized image-based products can also include digital photo stories, photo blogs, electronic photo messages, and photo postings, which can be shared electronically such as over the Internet or a wireless network after the design is completed.

The selection of a page or a component within a page by a user for editing is not limited to the examples described above. In addition to the use of a mouse and touch screen, a user can use other input/output devices such as keyboard, a touchpad, a tactile sensor, an eye tracking device, a laser pointing device, a hand or body gesturing device, etc., which allow a user to interact with different design components at a user interface.

What is claimed is:

1. A method for assisting a user to design an image-based product, comprising:
    enabling the display of a design of an image-based product comprising a plurality of pages at a user interface by a computer system;
    storing, on the computer system, a snapshot image and one or more dynamic render objects in association with each of the plurality of pages in the design of the image-based product, wherein the one or more dynamic render objects are configured to be varied by a user;
    allowing a first page to be selected for editing by a user at the user interface, wherein the computer system is configured to perform the following steps in response to the user selection of the first page:
        representing the first page at the user interface by the one or more dynamic render objects associated with the first page;
        representing the plurality of pages other than the first page by their respective snapshot images at the user interface; and
        allowing the user to vary the one or more dynamic render objects in the first page at the user interface; and
    allowing a second page to be selected by the user at the user interface, wherein the computer system is configured to perform the following steps in response to the user selection of the second page:
        storing an updated snapshot image for the first page on the computer system;
        representing the first page by the updated snapshot image at the user interface;
        changing representation of the second page at the user interface to the one or more dynamic render objects associated with the second page;
        representing the plurality of pages other than the first page and the second page by their respective snapshot images at the user interface; and
        allowing the user to vary the one or more dynamic render objects in the second page at the user interface to create at least a portion of the design for the image-based product.

2. The method of claim 1, wherein the computer system comprises a network-based system, a standalone computer device, or a mobile device.

3. The method of claim 1, wherein the first page or the second page is respectively selected by moving a cursor over the first page or the second page at the user interface, wherein the cursor is moved with a mouse by the user.

4. The method of claim 1, wherein the user interface is displayed on a touch sensitive display device, wherein the first page or the second page is selected by touching the touch sensitive display device by the user.

5. The method of claim 1, wherein the user is allowed to vary an image, text, a dimension, a color of the one or more dynamic render objects in the first page or the second page.

6. The method of claim 1, wherein the image-based product comprises a photo book, a photo calendar, a photo collage, a photo album, a photo greeting card, a photo stationery, an image print, a photo banner, a photo T-shirt, a photo coffee mug, a photo mouse pad, a photo key-chain, a photo collector, or a photo coaster.

7. The method of claim 1, wherein the image-based product comprises a personalized digital photo story, a photo blog, an electronic photo messages, and a photo posting, the method further comprising:

electronically sharing the design of image-based product.

8. The method of claim 1, wherein the image-based product comprises a photo book, the method further comprising:

displaying a multi-page view comprising layouts of the plurality of pages at the user interface, wherein each of the layouts is represented by either the snapshot image or the one or more dynamic render objects associated with the corresponding one of the plurality of pages.

9. A method for assisting a user to design an image-based product, comprising:

enabling the display of a design of an image-based product comprising a plurality of components at a user interface by a computer system;

storing, on the computer system, a snapshot image and one or more dynamic render objects in association with each of the plurality of components in the design of the image-based product, wherein the one or more dynamic render objects are configured to be varied by a user;

allowing a first component to be selected for editing by a user at the user interface, wherein the computer system is configured to perform the following steps in response to the user selection of the first component:

representing the first component at the user interface by the one or more dynamic render objects associated with the first component;

representing the plurality of components other than the first component by their respective snapshot images at the user interface; and allowing the user to vary the one or more dynamic render objects in the first component at the user interface; and allowing a second component to be selected by the user at the user interface, wherein the computer system is configured to perform the following steps in response to the user selection of the second component:

storing an updated snapshot image for the first component on the computer system;

representing the first component by the updated snapshot image at the user interface;

representing the second component at the user interface by the one or more dynamic render objects associated with the second component;

representing the plurality of components other than the first component and the second component by their respective snapshot images at the user interface; and allowing the user to vary the one or more dynamic render objects in the second component at the user interface to create at least a portion of the design for the image-based product.

10. The method of claim 9, wherein the computer system comprises a network-based system, a standalone computer device, or a mobile device.

11. The method of claim 9, wherein the first component or the second component is respectively selected by moving a cursor over the first component or the second component at the user interface, wherein the cursor is moved with a mouse by the user.

12. The method of claim 9, wherein the user interface is displayed on a touch sensitive display device, wherein the first component or the second component is selected by touching the touch sensitive display device by the user.

13. The method of claim 9, wherein the image-based product comprising a plurality of pages, wherein the plurality of components comprise the plurality of pages.

14. The method of claim 9, wherein the user is allowed to vary an image, text, a dimension, a color of the one or more dynamic render objects in the first component or the second component.

15. The method of claim 9, wherein the image-based product comprises a photo book, a photo calendar, a photo collage, a photo album, a photo greeting card, a photo stationery, an image print, a photo banner, a photo T-shirt, a photo coffee mug, a photo mouse pad, a photo key-chain, a photo collector, or a photo coaster.

16. The method of claim 9, wherein the image-based product comprises a personalized digital photo story, a photo blog, an electronic photo messages, and a photo posting, the method further comprising:

electronically sharing the design of image-based product.

17. A method for assisting a user to design a photo book, comprising:

enabling a design of the photo book to be displayed at a user interface by a computer system;

displaying layouts of a first page and a second page of the photo book at the user interface;

storing, on a computer system, a first snapshot image and a first dynamic render object in association with the first page and a second snapshot image and a second dynamic render object in association with the second page;

allowing a user to select the first page for editing by at the user interface, wherein the computer system is configured to perform the following steps in response to user selection of the first page:

representing the first page by the first dynamic render object at the user interface;

representing the second page by the second snapshot image at the user interface; and allowing the user to vary the first dynamic render object in the first page at the user interface; and allowing the user to select the second page for editing at the user interface, wherein the computer system is configured to perform the following steps in response to the user selection of the second page:

storing an updated snapshot image for the first page on the computer system, wherein the updated snapshot image comprises changes made by the user to the first dynamic render object;

representing the first page by the updated snapshot image at the user interface;

changing representation of the second page at the user interface to the second dynamic render object; and allowing the user to vary the second dynamic render object in the second page at the user interface to create at least a portion of the design for the photobook.

18. The method of claim 17, wherein the computer system comprises a network-based system, a standalone computer device, or a mobile device.

19. The method of claim 17, wherein the first page or the second page is respectively selected by moving a cursor over the first page or the second page at the user interface, wherein the cursor is moved with a mouse by the user.

20. The method of claim 17, wherein the user interface is displayed on a touch sensitive display device, wherein the first page or the second page is selected by touching the touch sensitive display device by the user.

\* \* \* \* \*